May 20, 1924.
F. P. MILLER ET AL
QUICK CHANGE CHUCK AND COLLET
Filed Oct. 3, 1921
1,494,859
2 Sheets-Sheet 2
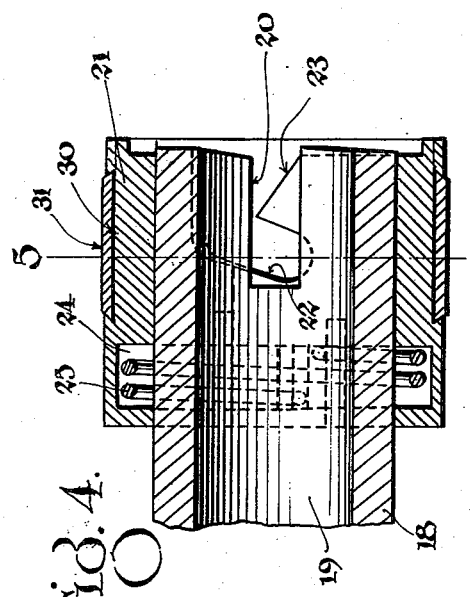
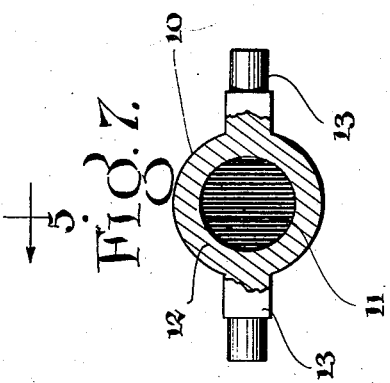
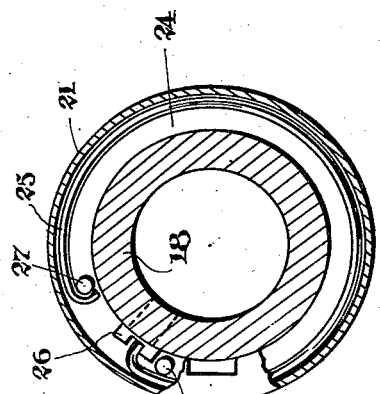
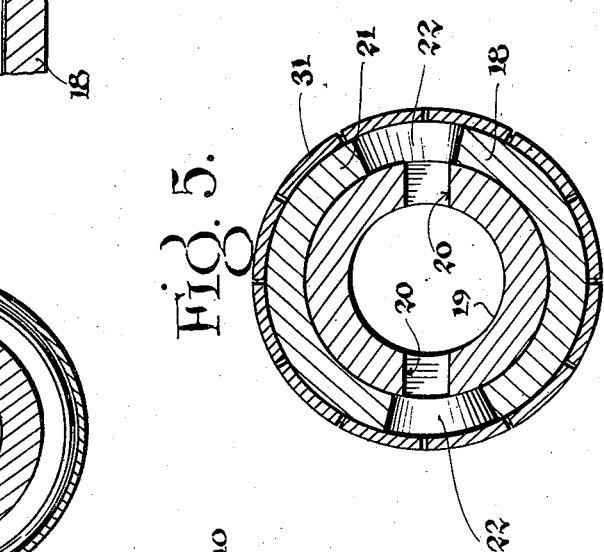
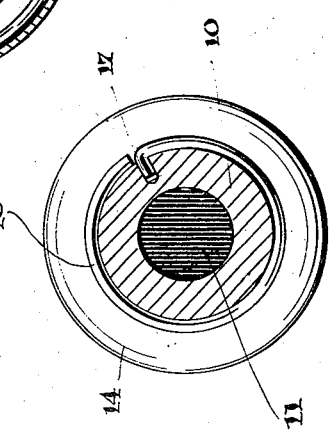
WITNESSES
S. H. NORTON.
INVENTOR
F. P. MILLER.
BY
ATTORNEYS Patented May 20, 1924.

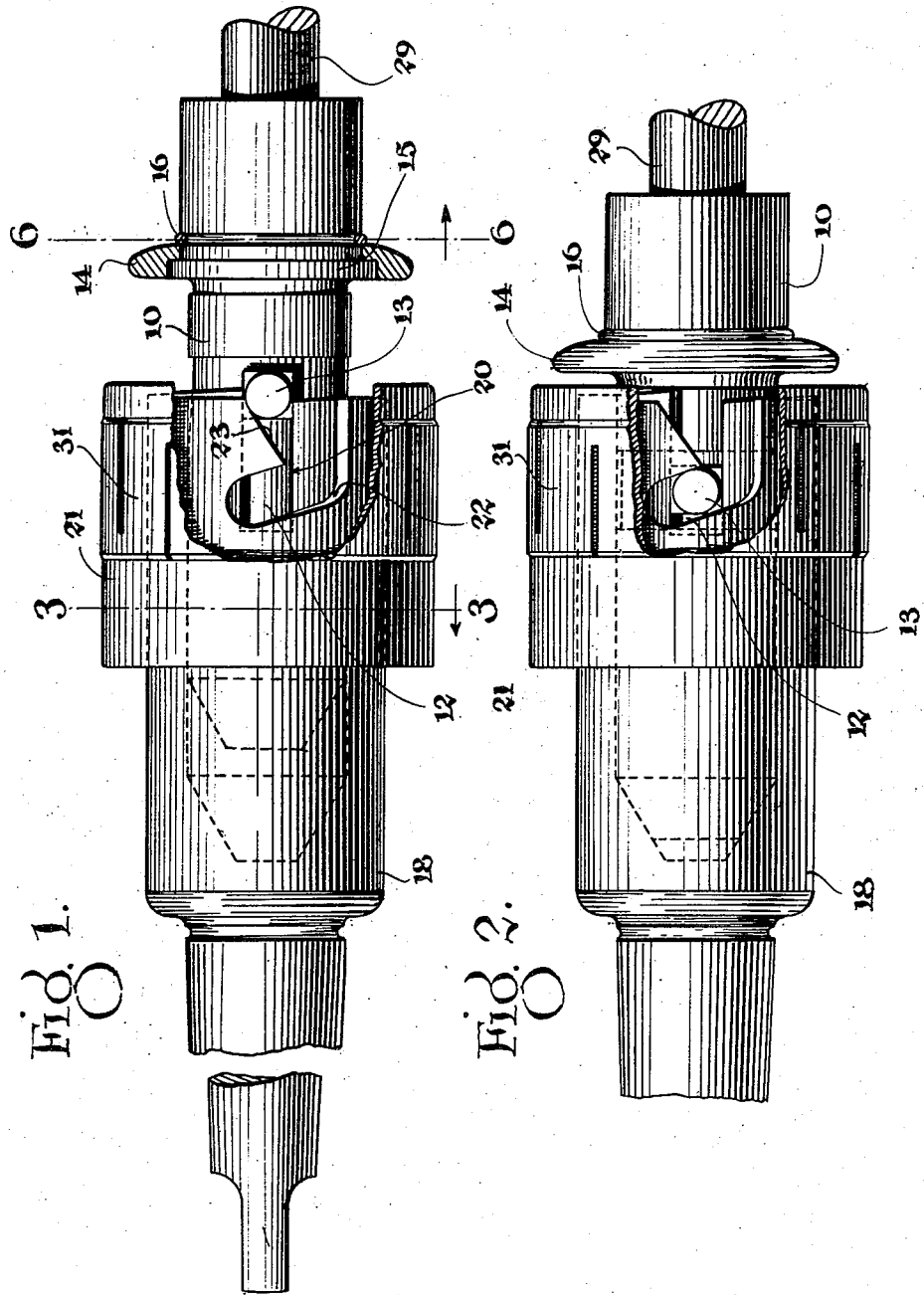

1,494,859

UNITED STATES PATENT OFFICE.

FRANK P. MILLER AND SAMUEL HARRY NORTON, OF MEADVILLE, PENNSYLVAN: ASSIGNORS TO McCROSKY TOOL CO., OF MEADVILLE, PENNSYLVANIA, A CORPORA-TION OF PENNSYLVANIA.

QUICK-CHANGE CHUCK AND COLLET.

Application filed October 3, 1921. Serial No. 505,146.

*To all whom it may concern:*

Be it known that we, FRANK P. MILLER and SAMUEL HARRY NORTON, citizens of the United States, and residents of Meadville, in the county of Crawford and State of Pennsylvania, have invented certain new and useful Improvements in Quick-Change Chucks and Collets, of which the following is a specification.

Our present invention relates generally to machine tools and more particularly to an improved chuck and collet for drilling machines, our object among others being the provision of an improved construction by means of which the collet may be shifted into the chuck with one hand without the necessity of touching the chuck.

A further object is the provision of a structure whereby the hand need not engage a rotating part when shifting the collet into a rotating chuck.

A still further object is the provision of means protecting the hand when grasping the chuck prior to releasing the collet, by avoiding the present necessity of grasping the chuck carried ring which locks the collet in driving relation.

In the accompanying drawings which illustrate our present invention and form a part of this specification, Figure 1 is a side view showing the chuck and collet about to be engaged, each part being slightly broken away and in section.

Figure 2 is a side view showing the collet locked within the chuck, the latter being partly broken away.

Figure 3 is a transverse section taken through the chuck on line 3—3 of Fig. 1.

Figure 4 is a longitudinal section through a portion of the chuck.

Figure 5 is a transverse section through the chuck on line 5—5 of Fig. 4.

Figure 6 is a transverse section taken through the collet on line 6—6 of Fig. 1, and, Figure 7 is a transverse section through the collet adjacent to its trunnions or driving lugs.

Referring now to these figures, the collet as proposed by our invention and as generally seen at 10 in Figures 1, 2, 6 and 7 has the usual drill shank receiving bore 11 and the usual chuck entering stem 12, the latter of which has the diametrically outstanding trunnions 13 which form driving lugs in connection with the chuck. Our improved collet differs from known devices by virtue of the fact that the ring 14, usually solid, is rotatably disposed around the shank of the collet against an annular flange 15 and is supported against displacement lengthwise of the collet by a spring locking ring 16 partially seated in an annular groove and having one inturned end 17 projecting into a diametrical opening of the collet as seen in Fig. 6.

The chuck 18 has the usual collet receiving bore 19 and diametrically opposed lengthwise slots 20 extending inwardly from the receiving end for the reception of the driving lugs of the collet. In the present construction, the locking collar 21 around the chuck has one side wall of each of its bayonet slots 22 in the nature of a shoulder extending partially across the respective driving slot 20 and provided with an outwardly facing inclined surface 23 for engagement by one of the driving lugs so that inward movement of the latter from the position of Fig. 1 will force the collar 21 to partially rotate and permit the driving lugs to slip into the locked position shown in Fig. 2. It obviously requires but one hand to do this and in so doing it is apparent the chuck need not be touched and the collet may be grasped by a rotatably shiftable part, namely the ring so that the hand does not actually touch a rotatably driven part and is in no danger of harm by friction.

The collar 21 has an inner annular groove 24 in which a coil spring 25 is seated around the chuck body. One end of this spring extends angularly into a notched projection 26 of the chuck body while its opposite end engages a pin 27 of the collar which, with a spaced pin 28, form the limitations of rotative movement of the collar upon opposite sides of projection 26.

In releasing the collet 10 from the rotating chuck for a quick interchange of collets in order to bring into use a different drill, a portion of the shank of which is seen at 29 in Figures 1 and 2, it is usually necessary to directly grasp and frictionally hold the collar with sufficient pressure to force its rotative movement with respect to the chuck and against the tension of spring 25 until the shoulders of the collar are wholly beyond one side of the driving slots 20. This friction between the hand and the collar is very undesirable and frequently results in injury.

Accordingly our invention provides for a wide annular groove 30 in the external surface of the collar, having undercut sides, and receiving a loose band 31 having bevelled side edges and having an annular series of slots 32 extending partially therethrough from its alternately opposite edges. This permits the band to be squeezed into sufficiently tight engagement with the collar to hold the latter against the tension of its spring and yet permits the band to slip and be retained snugly in the hand.

The two features of our invention in the interests of safety, namely the collar supported rotatable gripping band and the rotatable collet ring will obviously protect the user's hands, while the particular construction of the collar slots will permit the collet to be shifted into either a rotating or stationary chuck with one hand.

It will be observed that the annulus 14 not only provides a convenient means whereby the collet may be manually raised, but that the annulus constitutes a guard by means of which the hand of the operator is spaced from contact with the chuck. Therefore the drill press operator may work with a feeling of absolute safety.

We claim:—

1. The combination with a collet receiving member, of a rotatable spring controlled sleeve mounted thereon and having lug locking slots, each of which is formed with a longitudinal branch having one wall inclined opposite the direction of rotation of the collet receiving member to permit the lug pressure to rotate said sleeve against the pressure of the spring by an end thrust of the collet, and a hand gripping member mounted on said collet receiving member and extending over the major portions of said slots and the lugs received therein.

2. In a chuck of the character described, the combination of a collet receiving member having lug driving slots, a rotatable spring controlled sleeve mounted thereon and having L shaped lug locking slots therein; one side of the longitudinal portion of said slots being tapered to permit the lug pressure to rotate said sleeve against the pressure of the spring by an end thrust of the collet.

3. The combination of a tool receiving, chuck engaging collet, and a hand engaging member rotatably mounted on the collet and extending beyond the surface thereof whereby to limit the axial movement of one's hand on the collet, there being means to hold the hand engaging member against end-wise movement on the collet.

4. The combination with a collet receiving member, of a rotatable spring controlled sleeve mounted thereon and having lug locking slots, each of which is formed with a longitudinal branch having one wall inclined opposite the direction of rotation of the collet receiving member to permit the lug pressure to rotate said sleeve against the pressure of the spring by an end thrust of the collet.

5. In a chuck of the character described, the combination of a collet receiving member having lug driving slots, a rotatable spring controlled sleeve mounted thereon and having L shaped lug locking slots therein; one side of the longitudinal portion of said slots being tapered opposite the direction of travel of the chuck to permit the lug pressure to rotate said sleeve against the pressure of the spring by an end thrust of the collet and a hand gripping member carried by said sleeve and extending over the major portions of said slots.

FRANK P. MILLER.
SAMUEL HARRY NORTON.